US009599161B2

(12) United States Patent
Walker et al.

(10) Patent No.: US 9,599,161 B2
(45) Date of Patent: Mar. 21, 2017

(54) ROLLING ELEMENT BEARING CONFIGURED WITH A CHANNEL

(71) Applicant: United Technologies Corporation, Hartford, CT (US)

(72) Inventors: Brady Walker, Rocky Hill, CT (US); Ronnie K. Kovacik, Manchester, CT (US); Nasr A. Shuaib, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 14/775,430

(22) PCT Filed: Mar. 14, 2014

(86) PCT No.: PCT/US2014/027028
§ 371 (c)(1),
(2) Date: Sep. 11, 2015

(87) PCT Pub. No.: WO2014/152167
PCT Pub. Date: Sep. 25, 2014

(65) Prior Publication Data
US 2016/0025140 A1 Jan. 28, 2016

Related U.S. Application Data

(60) Provisional application No. 61/783,608, filed on Mar. 14, 2013.

(51) Int. Cl.
*F16C 19/00* (2006.01)
*F16C 33/66* (2006.01)
(Continued)

(52) U.S. Cl.
CPC ........ *F16C 33/6674* (2013.01); *F01D 25/164* (2013.01); *F02C 7/06* (2013.01);
(Continued)

(58) Field of Classification Search
CPC .... F16C 33/586; F16C 33/60; F16C 33/6674; F16C 33/6677; F16C 33/6681;
(Continued)

(56) References Cited

U.S. PATENT DOCUMENTS 4,334,720 A 6/1982 Signer
4,463,994 A 8/1984 Eliason et al.
(Continued)

FOREIGN PATENT DOCUMENTS

JP 2005090713 4/2005

OTHER PUBLICATIONS

EP search report for EP14769302 dated Jun. 16, 2016.

*Primary Examiner* — James Pilkington
(74) *Attorney, Agent, or Firm* — O'Shea Getz P.C.

(57) ABSTRACT

A rolling element bearing includes a plurality of rolling elements, a bearing inner ring and a bearing outer ring. The rolling elements are arranged circumferentially around an axis, and radially between the inner ring and the outer ring. The inner ring includes a plurality of first passages, a second passage and a channel that extends axially into the inner ring. The first passages are arranged circumferentially around the axis. The first passages respectively extend axially through the inner ring from a plurality of first passage inlets to the channel. The second passage includes a second passage inlet that is substantially axially aligned with one of the first passage inlets. The second passage extends radially through the inner ring to a second passage outlet.

20 Claims, 7 Drawing Sheets

(51) Int. Cl.
*F02C 7/06* (2006.01)
*F01D 25/16* (2006.01)
*F16C 19/06* (2006.01)
*F16C 33/60* (2006.01)
*F16C 33/58* (2006.01)

(52) U.S. Cl.
CPC ............ F16C 19/06 (2013.01); F16C 33/586 (2013.01); F16C 33/60 (2013.01); F16C 33/6677 (2013.01); *F05D 2240/50* (2013.01); *F16C 33/6681* (2013.01); *F16C 2360/23* (2013.01)

(58) Field of Classification Search
CPC ........ F16C 2360/23; F01D 25/18; F02C 7/06; F05D 2240/50
See application file for complete search history.

(56) References Cited

U.S. PATENT DOCUMENTS

| | | | |
|---|---|---|---|
| 5,106,209 A | 4/1992 | Atkinson et al. | |
| 6,511,228 B2 | 1/2003 | Dusza | |
| 7,931,407 B2 * | 4/2011 | Begin | F01D 25/18 384/475 |
| 2006/0062504 A1 | 3/2006 | Wilton et al. | |
| 2009/0208151 A1 * | 8/2009 | Dobek | F16C 33/6659 384/91 |
| 2009/0317029 A1 | 12/2009 | Dobek et al. | |
| 2013/0004109 A1 | 1/2013 | Metzger et al. | |
| 2016/0003100 A1 * | 1/2016 | Walker | F01D 25/16 415/116 |

* cited by examiner

ROLLING ELEMENT BEARING CONFIGURED WITH A CHANNEL

CROSS-REFERENCE TO RELATED APPLICATIONS

This application claims priority to PCT Patent Appln. No. PCT/US14/27028 filed Mar. 14, 2014, which claims priority to U.S. Provisional Patent Appln. No. 61/783,608 filed Mar. 14, 2013, which are hereby incorporated herein by reference in their entireties.

BACKGROUND OF THE INVENTION

1. Technical Field

This disclosure relates generally to a rolling element bearing and, more particularly, to a rolling element bearing configured with one or more fluid passages.

2. Background Information

A typical rolling element bearing for a turbine engine includes a plurality of rolling elements that are radially engaged between a bearing inner ring and a bearing outer ring. The inner ring may include a plurality of fluid passages that direct lubrication oil to a seal plate mounted axially adjacent the inner ring. The seal plate may include an annular notch that fluidly couples the fluid passages in the inner ring to a plurality of fluid passages in the seal plate. However, where the number of fluid passages in the seal plate is greater than the number of fluid passages in the inner ring, some of the fluid passages in the seal plate may receive more of the lubrication oil than others. A larger portion of the lubrication oil, for example, will generally flow into those fluid passages in the seal plate that are located circumferentially closest to the fluid passages in the inner ring. Such a non-uniform distribution of the lubrication oil through the seal plate may cause a non-uniform temperature differential in the seal plate, which may increase thermally induced stresses and distortions within the seal plate.

There is a need in the art for an improved rolling element bearing.

SUMMARY OF THE DISCLOSURE

According to an aspect of the invention, a rolling element bearing is provided that includes a plurality of rolling elements, a bearing inner ring and a bearing outer ring. The rolling elements are arranged circumferentially around an axis, and radially between the inner ring and the outer ring. The inner ring includes a plurality of first passages, a second passage and a channel that extends axially into the inner ring. The first passages are arranged circumferentially around the axis. The first passages respectively extend axially through the inner ring from a plurality of first passage inlets to the channel. The second passage includes a second passage inlet that is substantially axially aligned with one of the first passage inlets. The second passage extends radially through the inner ring to a second passage outlet.

According to another aspect of the invention, another rolling element bearing is provided that includes a plurality of rolling elements, a bearing inner ring and a bearing outer ring. The rolling elements are arranged circumferentially around an axis, and radially between the inner ring and the outer ring. The inner ring includes a first channel, a second channel and a plurality of passages that are arranged circumferentially around the axis. The first channel extends axially into the inner ring, and the second channel extends axially into the inner ring. The passages are fluidly coupled with and extend axially through the inner ring between the first channel and the second channel.

According to still another aspect of the invention, an assembly for a turbine engine is provided that includes a rolling element bearing and a turbine engine component. The rolling element bearing and the turbine engine component are arranged along an axis, and the bearing includes an inner ring. The inner ring includes a plurality of first passages and a first channel that extends axially into the inner ring. The first passages are arranged circumferentially around the axis. The first passages respectively extend axially through the inner ring from a plurality of first passage inlets to the first channel. The turbine engine component includes a component channel that extends axially into the turbine engine component, where the component channel is fluidly coupled with the first channel. An outer radius of the component channel is less than an outer radius of the first channel.

The channel (or first channel) may extend circumferentially around the axis through the inner ring.

The channel (or first channel) may be configured as or otherwise include an annular notch. The channel (or first channel) may extend radially into the inner ring from an inner side of the inner ring.

The inner ring may extend axially between a first end and a second end. The first passage inlets and the second passage inlet may be located at the first end. The channel (or first channel) may extend axially into the inner ring from the second end.

The channel may be configured as or otherwise include a first channel. The inner ring may also include a second channel that extends axially into the inner ring and is fluidly coupled with the first passage inlets and the second passage inlet.

One of the passages (or first passages) may include a slot that extends radially into the inner ring from an inner side of the inner ring.

The second passage may include a slot and an aperture that is fluidly coupled with the slot. The slot may extend axially through the inner ring from the second passage inlet. The aperture may extend radially through the inner ring to the second passage outlet.

The channel may be configured as or otherwise include a first channel. The inner ring may also include a second channel that extends axially within the inner ring and fluidly couples the slot to the aperture. One of the first passages may include a second slot and a third slot. The second slot may extend axially through the inner ring to the second channel. The third slot may extend axially through the inner ring from the second channel to the first channel.

The second passage may be one of a plurality of second passages that extend radially through the inner ring.

The inner ring may be configured as or otherwise include a split ring.

The passages may be configured as or otherwise include a plurality of first passages. The inner ring may also include a second passage that is fluidly coupled with the second channel and extends radially through the inner ring to a second passage outlet.

The second channel may be configured as or otherwise include an annular notch. The second channel may extend radially into the inner ring from the inner side.

The component channel may extend circumferentially around the axis through the turbine engine component.

The component channel may be configured as or otherwise include an annular notch. The component channel may extend radially into the turbine engine component from an inner side of the turbine engine component.

The inner ring may include a second passage that extends radially through the inner ring to a second passage outlet.

The inner ring may include a second channel that extends axially into the inner ring. The first passages may extend axially through the inner ring between the first channel and the second channel.

The turbine engine component may include a plurality of component passages. The component passages may be arranged circumferentially around the axis. The component passages may respectively extend through the turbine engine component from the component channel to a plurality of component passage outlets. The component channel may fluidly couple the first channel to the component passages.

The turbine engine component may be configured as or otherwise include a seal plate.

The passages (or first passages) may be configured as or otherwise include a plurality of axial passages. The second passage may also or alternatively be configured as or otherwise include a radial passage. The component passages may also or alternatively be configured as or otherwise include a plurality of seal plate passages.

The channel (or first channel) may be configured as or otherwise include an outlet channel. The second channel may also or alternatively be configured as or otherwise include an inlet channel or an intermediate channel. The component channel may also or alternatively be configured as or otherwise include a seal plate channel.

The foregoing features and the operation of the invention will become more apparent in light of the following description and the accompanying drawings.

DETAILED DESCRIPTION OF THE INVENTION

Figure 1:
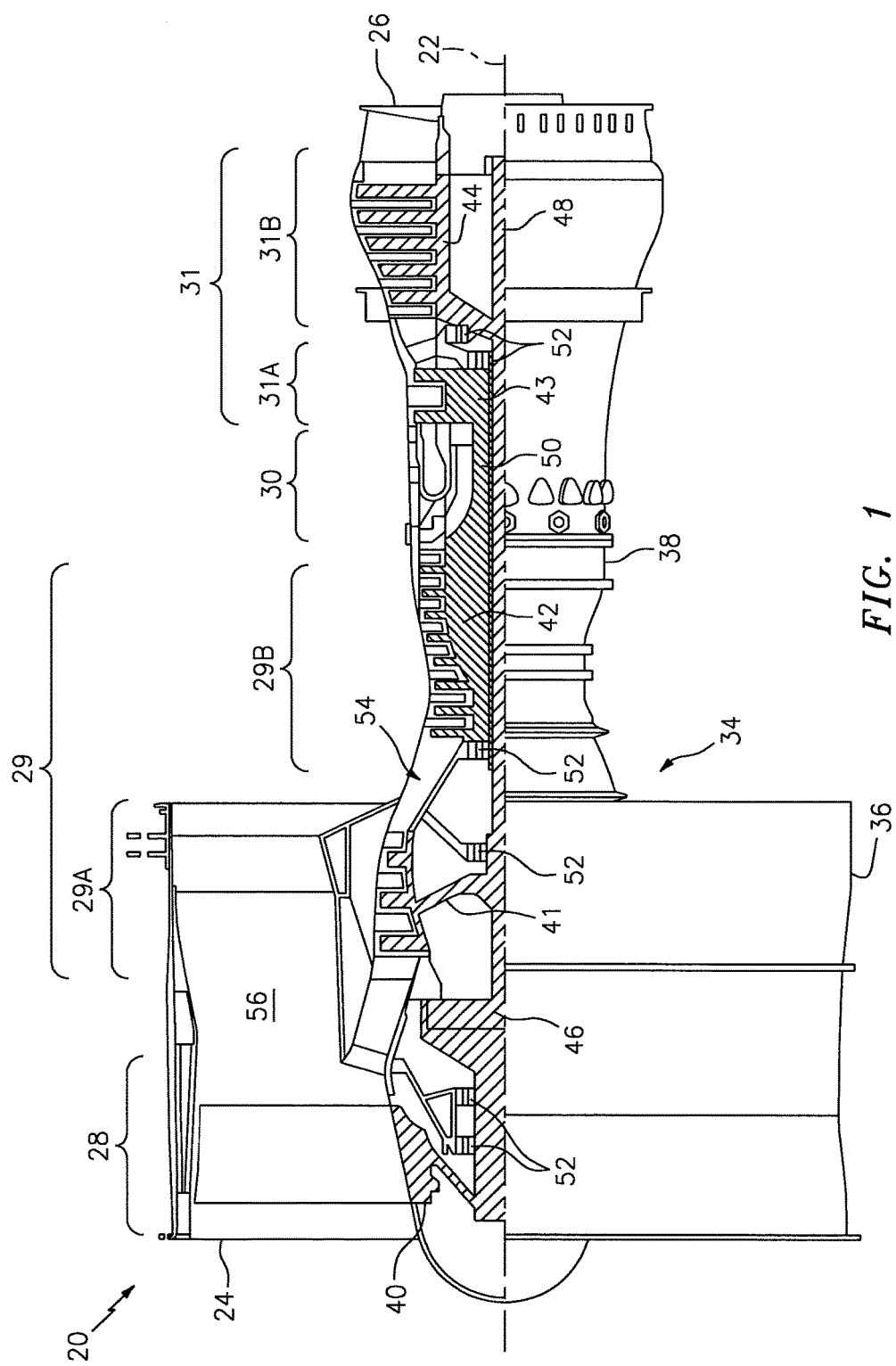
FIG. 1 is a side cutaway illustration of a geared turbine engine.

FIG. 1 is a side cutaway illustration of a geared turbine engine 20 that extends along an axis 22 between an upstream airflow inlet 24 and a downstream airflow exhaust 26. The engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B. The engine sections 28-31 are arranged sequentially along the axis 22 within an engine housing 34, which includes a first engine case 36 (e.g., a fan nacelle) and a second engine case 38 (e.g., a core nacelle).

Each of the engine sections 28, 29A, 29B, 31A and 31B includes a respective rotor 40-44. Each of the rotors 40-44 includes a plurality of rotor blades arranged circumferentially around and connected to (e.g., formed integral with or attached to) one or more respective rotor disks. The fan rotor 40 is connected to a gear train 46; e.g., an epicyclic gear train. The gear train 46 and the LPC rotor 41 are connected to and driven by the LPT rotor 44 through a low speed shaft 48. The HPC rotor 42 is connected to and driven by the HPT rotor 43 through a high speed shaft 50. The low and high speed shafts 48 and 50 are rotatably supported by a plurality of bearings 52. Each of the bearings 52 is connected to the second engine case 38 by at least one stator such as, for example, an annular support strut.

Air enters the engine 20 through the airflow inlet 24, and is directed through the fan section 28 and into an annular core gas path 54 and an annular bypass gas path 56. The air within the core gas path 54 may be referred to as "core air". The air within the bypass gas path 56 may be referred to as "bypass air". The core air is directed through the engine sections 29-31 and exits the engine 20 through the airflow exhaust 26. Within the combustor section 30, fuel is injected into and mixed with the core air and ignited to provide forward engine thrust. The bypass air is directed through the bypass gas path 56 and out of the engine 20 to provide additional forward engine thrust, or reverse thrust via a thrust reverser.

Figure 2:
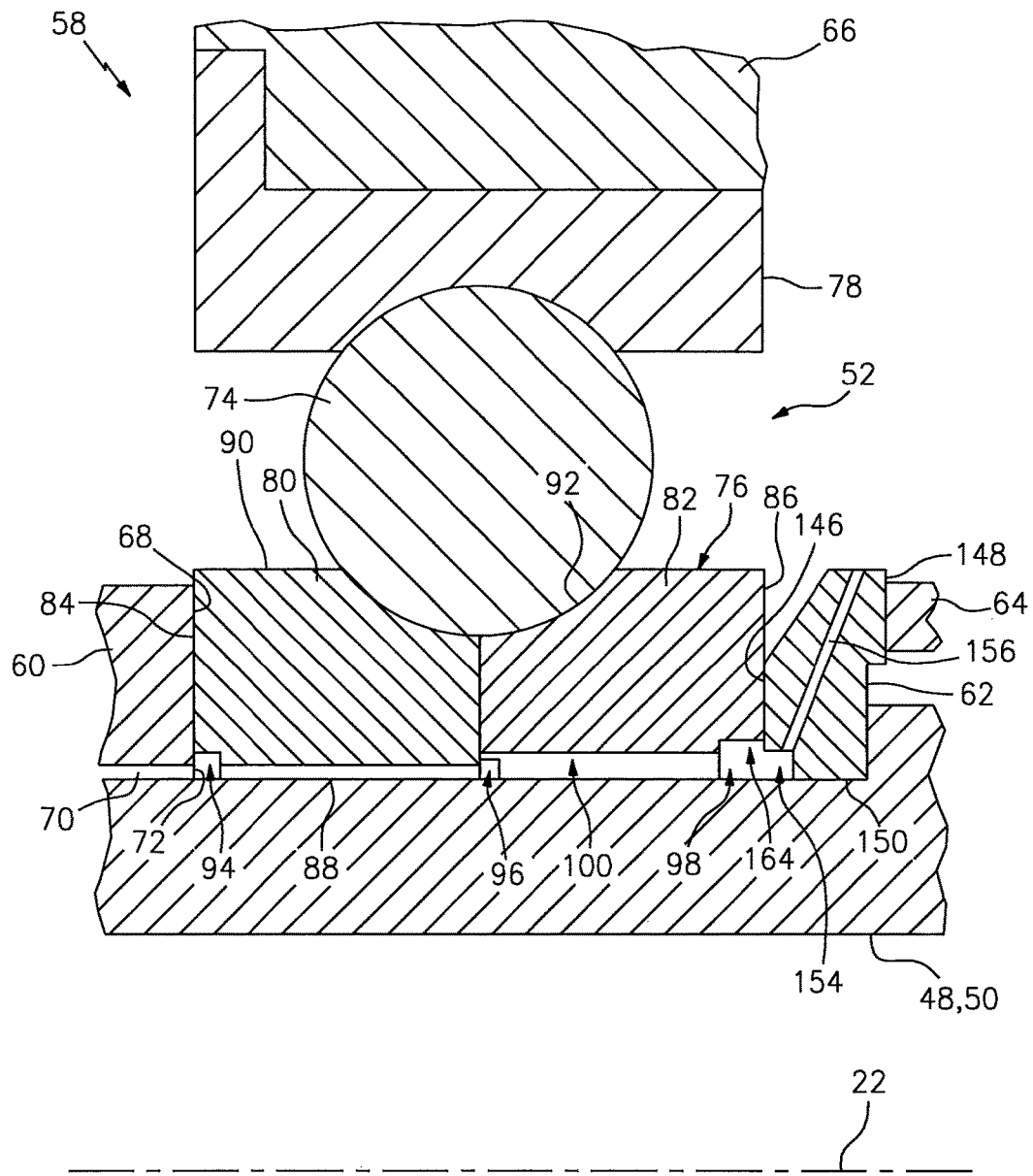
FIG. 2 is a side sectional illustration of a portion of an assembly for the engine of FIG. 1.

FIG. 2 is a side sectional illustration of a portion of an assembly 58 for the engine 20 of FIG. 1. The assembly 58 includes one of the shafts 48 and 50, a spacer 60, one of the bearings 52, a seal plate 62, and a face seal 64 (e.g., an annular carbon face seal). The assembly 58 also includes a stator 66 such as, for example, the strut that structurally connects the bearing 52 to the second engine case 38 (see FIG. 1).

The spacer 60 extends axially to a spacer end 68. The spacer 60 includes one or more spacer passages 70 that are arranged circumferentially around the axis 22. One or more of the spacer passages 70 each extends axially through the spacer 60 to a spacer passage outlet 72, which is located at (e.g., on, adjacent or proximate) the spacer end 68.

The bearing 52 of FIG. 2 is configured as a rolling element bearing such as, for example, a ball bearing. Alternatively, the bearing 52 may be configured as a cylindrical rolling bearing, a tapered rolling bearing, a spherical rolling bearing, a needle rolling bearing, or any other type of rolling element bearing. The bearing 52 includes a plurality of rolling elements 74, a bearing inner ring 76 and a bearing outer ring 78. The rolling elements 74 are arranged circumferentially around the axis 22, and radially between the inner ring 76 and the outer ring 78.

The inner ring 76 is configured as a split ring that includes, for example, a pair of axial ring segments 80 and 82. Alternatively, the inner ring 76 may be configured as a unitary body. The inner ring 76 extends circumferentially around the axis 22. The inner ring 76 extends axially between a ring first end 84 and a ring second end 86. The inner ring 76 extends radially between a ring inner side 88 and a ring outer side 90. The inner side 88 defines a bore of the inner ring 76. The outer side 90 includes a raceway surface 92 that engages (e.g., contacts) the rolling elements 74.

Figure 3:
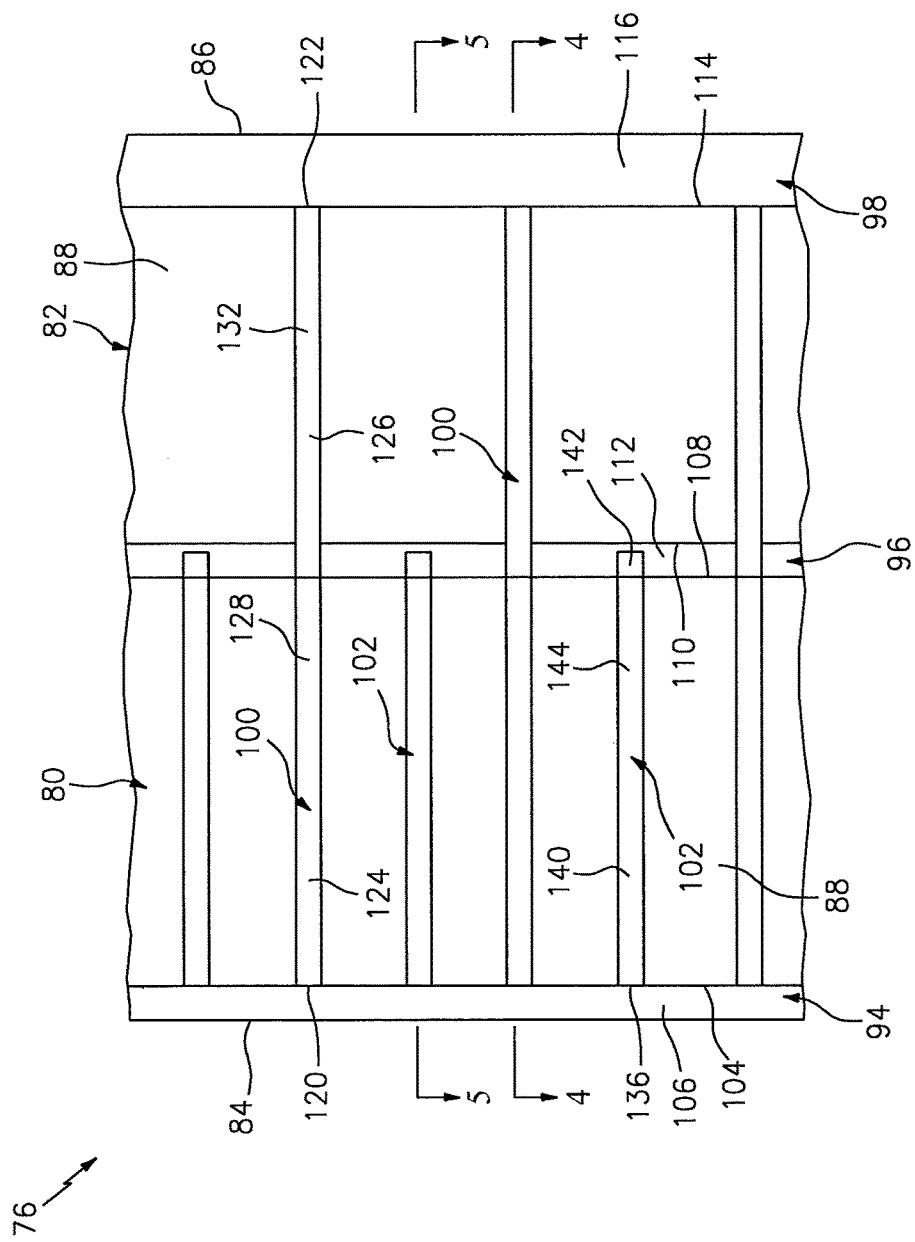
FIG. 3 is an illustration of a portion of an inner side of a bearing inner ring for the assembly of FIG. 2.
Figure 4:
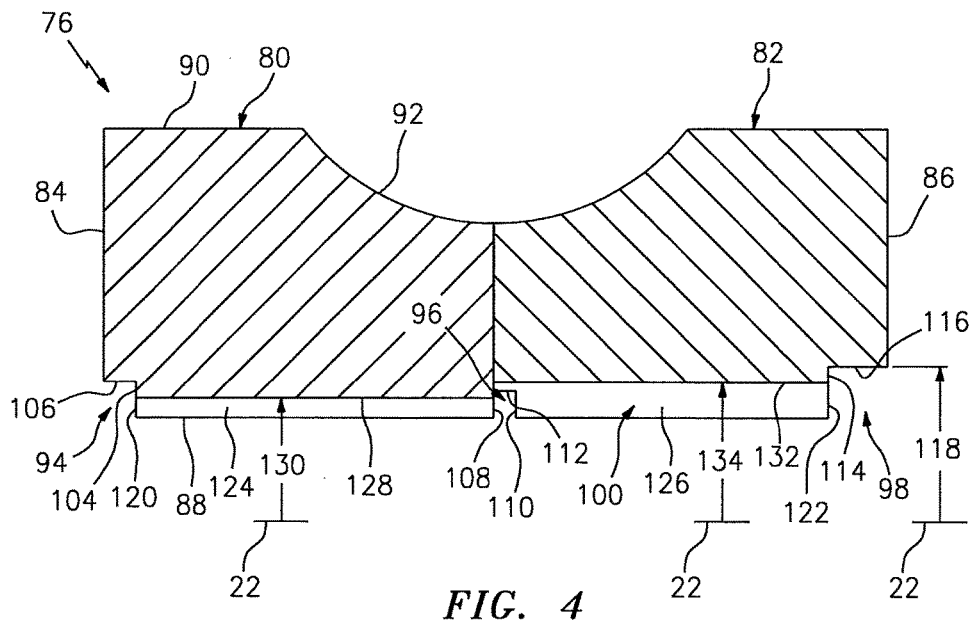
FIG. 4 is a side sectional illustration of the inner ring of FIG. 3 at a first circumferential position.
Figure 5:
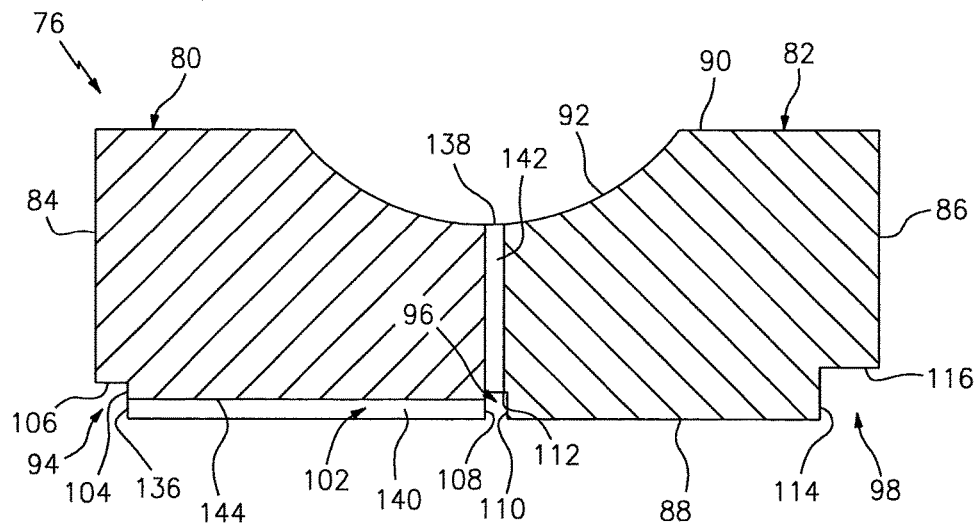
FIG. 5 is a side sectional illustration of the inner ring of FIG. 3 at a second circumferential position.

Referring to FIGS. 3 to 5, the inner ring 76 includes one or more ring channels (e.g., fluid collection and/or distribution channels) such as, for example, an inlet channel 94, an intermediate channel 96 and an outlet channel 98. The inner ring 76 also includes one or more ring passages (e.g., fluid passages) such as, for example, one or more axial passages 100 and one or more radial passages 102.

The inlet channel 94 may be configured as an annular notch. The inlet channel 94 extends axially into the inner ring 76 from the ring first end 84 to an inlet channel end 104. The inlet channel 94 extends radially into the inner ring 76 from the ring inner side 88 to an inlet channel side 106. The inlet channel 94 extends circumferentially around the axis 22 through the inner ring 76.

The intermediate channel 96 may be configured as an annular groove that is defined between the ring segments 80 and 82. The intermediate channel 96 extends axially within the inner ring 76 between an intermediate channel first end 108 and an intermediate channel second end 110. The intermediate channel 96 extends radially into the inner ring 76 from the ring inner side 88 to an intermediate channel side 112. The intermediate channel 96 extends circumferentially around the axis 22 through the inner ring 76.

The outlet channel 98 may be configured as an annular notch. The outlet channel 98 extends axially into the inner ring 76 from the ring second end 86 to an outlet channel end 114. The outlet channel 98 extends radially into the inner ring 76 from the ring inner side 88 to an outlet channel side 116, which defines an outer radius 118 of the outlet channel 98. The outlet channel 98 extends circumferentially around the axis 22 through the inner ring 76.

Referring to FIGS. 3 and 4, the axial passages 100 are arranged circumferentially around the axis 22. One or more of the axial passages 100 each extends axially through the inner ring 76 between an axial passage inlet 120 and an axial passage outlet 122. The axial passage inlet 120 is located at the inlet channel end 104, and is fluidly coupled with the inlet channel 94. The axial passage outlet 122 is located at the outlet channel end 114, and is fluidly coupled with the outlet channel 98.

One or more of the axial passages 100 each includes one or more slots 124 and 126. The first slot 124 extends axially through the inner ring 76 from the axial passage inlet 120 and the inlet channel 94 to the intermediate channel 96. The first slot 124 extends radially into the inner ring 76 from the ring inner side 88 to a first slot side 128, which defines an outer radius 130 of the first slot 124. This outer radius 130 may be less than (or alternatively substantially equal to) the outer radius 118. The second slot 126 extends axially through the inner ring 76 from the intermediate channel 96 to the outlet channel 98 and the axial passage outlet 122. The second slot 126 extends radially into the inner ring 76 from the ring inner side 88 to a second slot side 132, which defines an outer radius 134 of the second slot 126. This outer radius 134 may be greater than (or alternatively substantially equal to) the outer radius 130, and/or less than (or alternatively substantially equal to) the outer radius 118. In this manner, the axial passages 100 may radially taper as the passages 100 extend axially from the passage outlets 122 to the passage inlets 120.

Referring to FIGS. 3 and 5, the radial passages 102 are arranged circumferentially around the axis 22. Each of the radial passages 102, for example, is arranged between a respective adjacent pair of the axial passages 100. One or more of the radial passages 102 each extends radially through the inner ring 76 from a radial passage inlet 136 to a radial passage outlet 138. The radial passage inlet 136 is located at the inlet channel end 104, and is fluidly coupled with the inlet channel 94. Thus, one or more of the radial passage inlets 136 are axially aligned with one or more of the axial passage inlets 120. The radial passage outlet 138 is located at the ring outer side 90 and, for example, in the raceway surface 92.

One or more of the radial passages 102 each includes a slot 140 and an aperture 142 (e.g., a through hole). The slot 140 extends axially through the inner ring 76 from the radial passage inlet 136 and the inlet channel 94 to the intermediate channel 96. The slot 140 extends radially into the inner ring 76 from the ring inner side 88 to a slot side 144. The aperture 142 extends axially within the inner ring 76 between opposing sides. The aperture 142 extends radially through the inner ring 76 from the intermediate channel 96 to the radial passage outlet 138.

Figure 6:
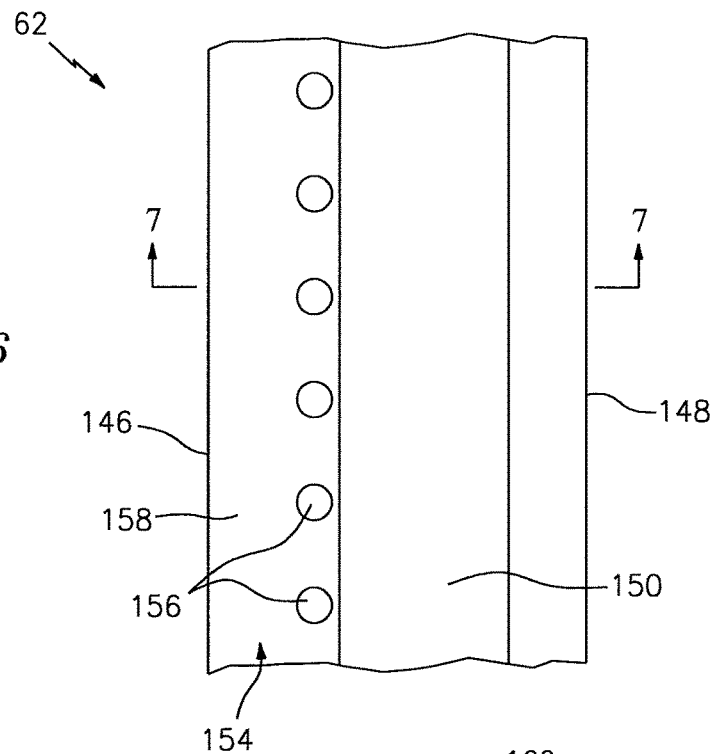
FIG. 6 is an illustration of a portion of an inner side of a seal plate for the assembly of FIG. 2.
Figure 7:
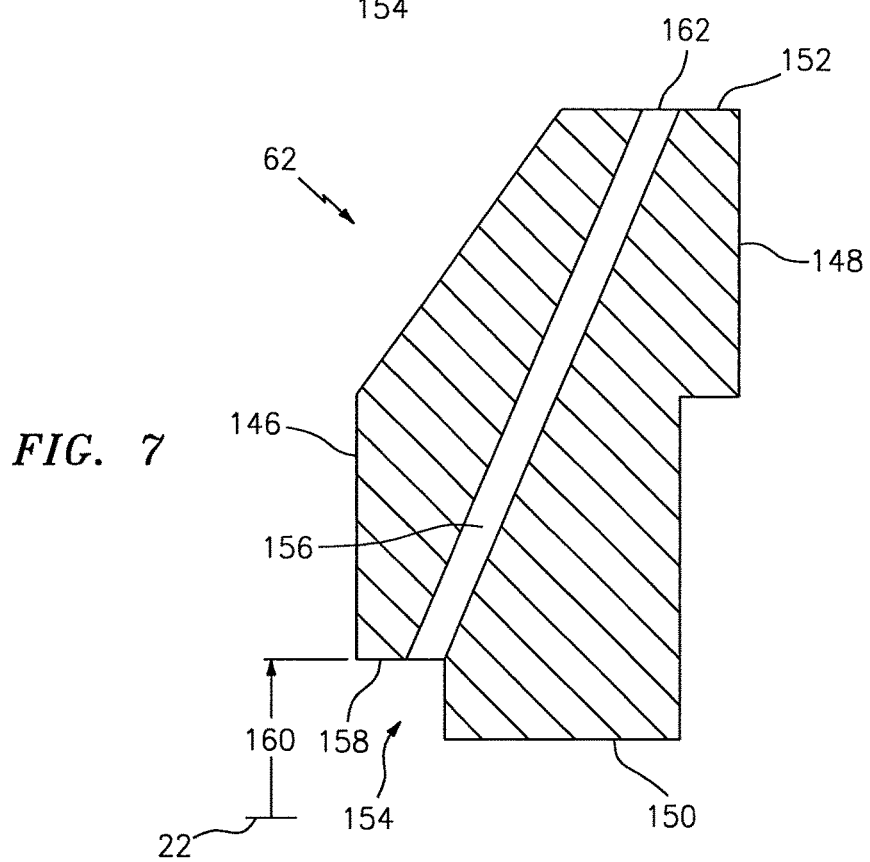
FIG. 7 is a side sectional illustration of the seal plate of FIG. 6.

Referring to FIGS. 6 and 7, the seal plate 62 extends axially between a seal plate first end 146 and a seal plate second end 148. The seal plate 62 extends radially between a seal plate inner side 150 and a seal plate outer side 152, where the inner side 150 defines a bore of the seal plate 62. The seal plate 62 extends circumferentially around the axis 22.

The seal plate 62 includes a seal plate channel 154 and one or more seal plate passages 156. The seal plate channel 154 may be configured as an annular notch. The seal plate channel 154 extends axially into the seal plate 62 from the first end 146. The seal plate channel 154 extends radially into the seal plate 62 from the inner side 150 to a seal plate channel side 158, which defines an outer radius 160 of the seal plate channel 154. This outer radius 160 is less than the outer radius 118 of the outlet channel 98 (see FIG. 4). The seal plate passages 156 are fluidly coupled with the seal plate channel 154, and arranged circumferentially around the axis 22. One or more of the seal plate passages 156 each extends radially and axially through the seal plate 62 from the seal plate channel 154 to a passage outlet 162 at the outer side 152.

Figure 8:
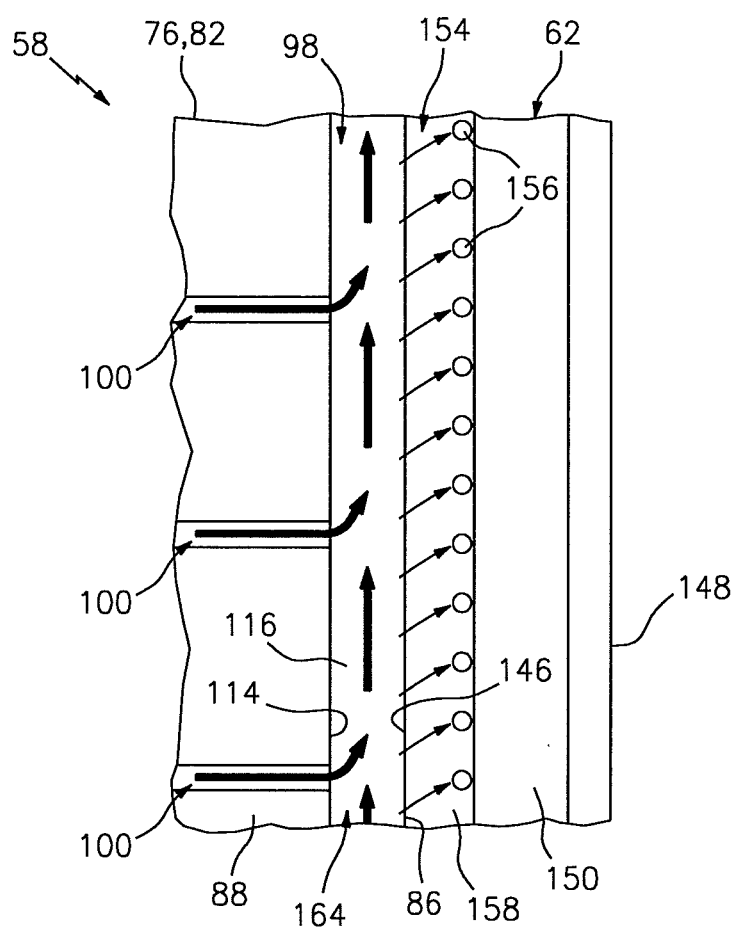
FIG. 8 is an illustration of a portion of an inner side of a bearing inner ring and a seal plate for the assembly of FIG. 2.

Referring to FIG. 2, the spacer 60, the inner ring 76 and the seal plate 62 are mounted on the shaft 48, 50. The ring first end 84 axially engages the spacer end 68. The ring second end 86 axially engages the seal plate first end 146, which defines a gutter 164 in the outlet channel 98. Referring to FIG. 8, the gutter 164 extends axially between the outlet channel end 114 and the seal plate first end 146, and radially outward to the outlet channel side 116. Referring again to FIG. 2, the ring inner side 88 and the seal plate inner side 150 radially engage the shaft 48, 50. The inlet channel 94 is fluidly coupled with the spacer passages 70. The outlet channel 98 and the gutter 164 are fluidly coupled with the seal plate channel 154 and, thus, with the seal plate passages 156. The seal plate second end 148 axially engages the face seal 64. The outer ring 78 is attached (e.g., mechanically fastened, welded, brazed, adhered and/or otherwise bonded) to the stator 66. The outer ring 78, for example, may be fastened to the stator 66 via an interference fit and/or bolted to the stator 66. In another example, the outer ring 78 may be clamped between a shoulder of the stator 66 and a nut.

Figure 9:
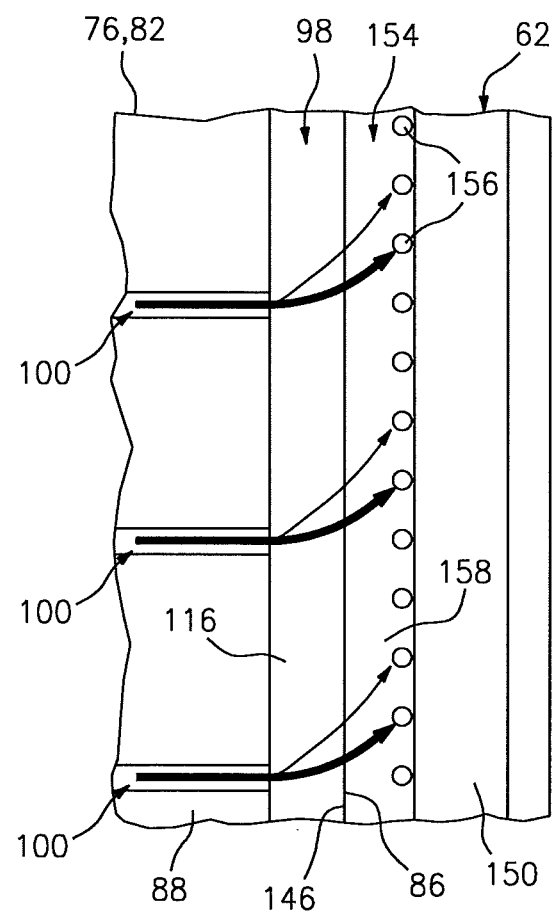
FIG. 9 is an illustration of a portion of an inner side of an alternate embodiment bearing inner ring and an alternate embodiment seal plate.

During turbine engine 20 operation, the inlet channel 94 receives fluid (e.g., lubrication oil) from the spacer passages 70. Referring to FIGS. 2 and 5, the radial passages 102 may direct a portion of the received fluid to one or more of the rolling elements 74. Referring to FIG. 2, the axial passages 100 may direct another portion of the received fluid to the outlet channel 98. Referring to FIG. 8, the fluid within the outlet channel 98 may pool within the gutter 164 and thereby substantially uniformly distribute the fluid around the axis 22. The seal plate passages 156 therefore may receive substantially equal portions of the pooled fluid. In contrast, referring to the alternate embodiment of FIG. 9, some of the seal plate passages 156 may receive more of the fluid than others where the outlet channel side 116 is substantially radially level with the seal plate channel side 158; e.g., the outer radius 118 (see FIG. 4) is substantially equal to (or less than) the outer radius 160 (see FIG. 7).

One or more components of the assembly 58 may have various configurations other than those described above and illustrated in the drawings. The spacer 60, for example, may alternatively be configured as a seal plate, a gear, a nut or any other type of turbine engine component that is mounted to a shaft of a turbine engine. The seal plate 62 may alternatively be configured as a spacer, a gear, a nut or any other type of turbine engine component that is mounted to a shaft of a turbine engine. The spacer 60 and/or the seal plate 62 may be omitted, and the inner ring 76 may be abutted against a shoulder of the shaft 48, 50. One or more of the components 60, 62 and 76 may be indirectly mounted onto the shaft 48, 50; e.g., mounted on another turbine engine component such as a sleeve. One or more of the channels 94 and 96 may be omitted; e.g., the axial passage inlets 120 and/or the radial passage inlets 136 may be located at the ring first side 84. One or more of the channels 94, 96 and 98 and/or one or more of the slots 124, 126 and 140 may each taper towards the ring first end 84. The present invention therefore is not limited to any particular assembly 58 component types and/or configurations.

The assembly 58 may be included in various turbine engines other than the one described above as well as in other types of rotational equipment. The assembly, for example, may be included in a geared turbine engine where a gear train connects one or more shafts to one or more rotors in a fan section, a compressor section and/or any other engine section. Alternatively, the assembly may be included in a turbine engine configured without a gear train. The assembly may be included in a geared or non-geared turbine engine configured with a single spool, with two spools (e.g., see FIG. 1), or with more than two spools. The turbine engine may be configured as a turbofan engine, a turbojet engine, a propfan engine, or any other type of turbine engine. The present invention therefore is not limited to any particular types or configurations of turbine engines or rotational equipment.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. An assembly for a turbine engine, comprising:
a rolling element bearing and a turbine engine component arranged along an axis, the bearing including an inner ring;
the inner ring including a plurality of first passages and a first channel that extends axially into the inner ring;
the first passages arranged circumferentially around the axis, and respectively extending axially through the inner ring from a plurality of first passage inlets to the first channel; and
the turbine engine component including a component channel that extends axially into the turbine engine component and is fluidly coupled with the first channel;
wherein an outer radius of the component channel is less than an outer radius of the first channel, and the first channel extends axially to and is partially formed by an axial end of the turbine engine component.

2. The assembly of claim 1, wherein the first channel extends circumferentially around the axis through the inner ring, and the component channel extends circumferentially around the axis through the turbine engine component.

3. The assembly of claim 1, wherein
the first channel comprises an annular notch, and further extends radially into the inner ring from an inner side of the inner ring; and
the component channel comprises an annular notch, and further extends radially into the turbine engine component from an inner side of the turbine engine component.

4. The assembly of claim 1, wherein the inner ring further includes a second passage that extends radially through the inner ring to a second passage outlet.

5. The assembly of claim 1, wherein
the inner ring further includes a second channel that extends axially into the inner ring; and
the first passages extend axially through the inner ring between the first channel and the second channel.

6. The assembly of claim 1, wherein
the turbine engine component further includes a plurality of component passages;
the component passages are arranged circumferentially around the axis, and respectively extend through the turbine engine component from the component channel to a plurality of component passage outlets; and
the component channel fluidly couples the first channel to the component passages.

7. The assembly of claim 1, wherein the turbine engine component comprises a seal plate.

8. An assembly for a turbine engine, comprising:
a turbine engine component; and
a rolling element bearing axially engaged with the turbine engine component along an axis, the bearing including an inner ring;
the inner ring including a plurality of axial passages and an outlet channel that extends axially into the inner ring;
the axial passages arranged circumferentially around the axis, and respectively extending axially through the inner ring from a plurality of first passage inlets to the outlet channel; and
the turbine engine component including a component channel that extends axially into the turbine engine component and is fluidly coupled with the outlet channel;
wherein the outlet channel extends axially to and is partially formed by an axial end of the turbine engine component.

9. The assembly of claim 8, wherein the outlet channel extends circumferentially around the axis through the inner ring, and the component channel extends circumferentially around the axis through the turbine engine component.

10. The assembly of claim 8, wherein
the outlet channel comprises an annular notch, and further extends radially into the inner ring from an inner side of the inner ring; and
the component channel comprises an annular notch, and further extends radially into the turbine engine component from an inner side of the turbine engine component.

11. The assembly of claim 8, wherein the inner ring further includes a second passage that extends radially through the inner ring to a second passage outlet.

12. The assembly of claim 8, wherein
the inner ring further includes a second channel that extends axially into the inner ring; and
the axial passages extend axially through the inner ring between the outlet channel and the second channel.

13. The assembly of claim 8, wherein
the turbine engine component further includes a plurality of component passages;
the component passages are arranged circumferentially around the axis, and respectively extend through the turbine engine component from the component channel to a plurality of component passage outlets; and
the component channel fluidly couples the outlet channel to the component passages.

14. The assembly of claim 8, wherein the turbine engine component is configured as a seal plate.

15. An assembly for a turbine engine, comprising:
a rolling element bearing and a turbine engine component arranged along an axis, the bearing including an inner ring;
the inner ring including a plurality of first passages and a first channel that extends axially into the inner ring from an axial end of the inner ring;
the first passages arranged circumferentially around the axis, and respectively extending axially through the inner ring from a plurality of first passage inlets to the first channel; and
the turbine engine component including a component channel that extends axially into the turbine engine component and is fluidly coupled with the first channel;
wherein an outer radius of the component channel is less than an outer radius of the first channel as measured at the axial end of the inner ring.

16. The assembly of claim 15, wherein the first channel extends circumferentially around the axis through the inner ring, and the component channel extends circumferentially around the axis through the turbine engine component.

17. The assembly of claim 15, wherein
the outlet channel comprises an annular notch, and further extends radially into the inner ring from an inner side of the inner ring; and
the component channel comprises an annular notch, and further extends radially into the turbine engine component from an inner side of the turbine engine component.

18. The assembly of claim 15, wherein the inner ring further includes a second passage that extends radially through the inner ring to a second passage outlet.

19. The assembly of claim 15, wherein
the inner ring further includes a second channel that extends axially into the inner ring; and
the axial passages extend axially through the inner ring between the first channel and the second channel.

20. The assembly of claim 15, wherein
the turbine engine component further includes a plurality of component passages;
the component passages are arranged circumferentially around the axis, and respectively extend through the turbine engine component from the component channel to a plurality of component passage outlets; and
the component channel fluidly couples the first channel to the component passages.

\* \* \* \* \*